United States Patent [19]
Indlekofer et al.

[11] Patent Number: 5,217,412
[45] Date of Patent: Jun. 8, 1993

[54] CONTINUOUSLY VARIABLE SPEED TRANSMISSION

[75] Inventors: Norbert Indlekofer, Bühl-Altschweier; Oswald Friedmann, Lichtenau, both of Fed. Rep. of Germany

[73] Assignee: LUK Lamellen und Kupplungsbau GmbH, Bühl, Fed. Rep. of Germany

[21] Appl. No.: 830,182

[22] Filed: Jan. 31, 1992

[30] Foreign Application Priority Data

Oct. 20, 1990 [DE] Fed. Rep. of Germany ....... 4033479
Feb. 2, 1991 [DE] Fed. Rep. of Germany ....... 4103214

[51] Int. Cl.[5] ............................................. F16H 59/00
[52] U.S. Cl. .......................................... 474/69; 474/28
[58] Field of Search ................. 474/17, 18, 28, 69, 474/70; 74/865, 866

[56] References Cited

U.S. PATENT DOCUMENTS

| | | | |
|---|---|---|---|
| 4,672,864 | 6/1987 | Morimoto | 474/28 X |
| 4,772,249 | 9/1988 | Kouno et al. | 474/28 |
| 4,778,435 | 10/1988 | Sugaya et al. | 474/28 |
| 4,867,732 | 9/1989 | Soga et al. | 474/28 |

FOREIGN PATENT DOCUMENTS 2828347 10/1982 Fed. Rep. of Germany .
3538884 5/1989 Fed. Rep. of Germany .
4036683 5/1991 Fed. Rep. of Germany .

*Primary Examiner*—Thuy M. Bui
*Attorney, Agent, or Firm*—Peter K. Kontler

[57] ABSTRACT

A continuously variable speed transmission wherein an input member is driven by an engine through a torque sensor and the input member drives an output member at a selected RPM through a pair of adjustable sheaves and an endless belt or chain which is trained over the sheaves. Each sheave has a fixed flange and an axially movable flange. The movable flanges can be shifted by hydraulic motors, and the pressure of fluid in such motors is determined by torque which is detected by the sensor as well as by the selected ratio of the transmission. The device which controls the pressure of fluid in the motors in dependency on the magnitude of torque and in dependency on the selected transmission ratio employs a pressure regulating valve which is connected with the torque sensor and with the motors and which is adjustable in automatic response to variations of transmission ratio.

15 Claims, 2 Drawing Sheets

CONTINUOUSLY VARIABLE SPEED TRANSMISSION

CROSS-REFERENCE TO RELATED CASE

The transmission of the present invention constitutes an improvement over and a further development of the transmission which is disclosed in commonly owned copending patent application Ser. No. 07/778,462 filed Oct. 16, 1991 by Oswald Friedmann for "Power Train".

BACKGROUND OF THE INVENTION

The invention relates to power trains, especially to power trains which can be installed between the engines and the wheels of motor vehicles. More particularly, the invention relates to improvements in power trains which operate with infinitely or continuously variable transmissions of the type employing two adjustable sheaves and an endless flexible torque transmitting element which is trained over the sheaves. Transmissions of the just outlined character are described and shown, for example, in the aforementioned copending patent application Ser. No. 07/778,462, in commonly owned U.S. Pat. No. 5,046,991 granted Sept. 10, 1991 to Friedmann for "Continuously Variable Speed Transmission" and in commonly owned copending patent application Ser. No. 07/616,371 filed Nov. 21, 1990 by Friedmann for "Continuously Variable Transmission". Still more particularly, the invention relates to improvements in power trains of the type wherein a continuously variable transmission can drive one or more pairs of wheels in a motor vehicle by way of one or more engageable and disengageable clutches which are connected in series with one sheave of the transmission.

Power trains of the above outlined character are disclosed, for example, in German Pat. No. 28 28 347 granted Oct. 21, 1982 to Rattunde and in German patent application No. 35 38 884 (published May 21, 1987) of Svab. The power trains of Rattunde and Svab employ a torque sensor which is installed between the engine of a motor vehicle and the input member of the transmission and constitutes a torque-responsive valve. The valve receives pressurized fluid from a pump. The arrangement is such that the valve is closed, at least in part, in response to abrupt rises of torque in order to effect an appropriate increase of fluid pressure in the motors (such as cylinder and piston units) which are employed to move the axially movable flanges of the sheaves relative to the axially fixed flanges. This results in more pronounced engagement between the flanges of the sheaves and the adjacent portions of the endless torque transmitting element which is trained over the sheaves. The valve which constitutes or forms part of the torque sensor comprises two discs having confronting ramps for rolling elements which are installed between the discs. The discs are biased toward each other, and hence against the rolling elements between them, by fluid pressure which is generated by the pump. When the torque which is transmitted from the engine to the input member of the transmission by way of the valve undergoes a pronounced increase, one of the discs turns relative to the other disc whereby the rolling elements move the discs apart and the axially movable disc alters the rate of flow of pressurized fluid from the valve. This entails a rise of fluid pressure and an increase of the force which the flanges of the sheaves exert against the adjacent portions of the torque transmitting element. The discs of the valve which forms part of or constitutes the torque sensor not only regulate the pressure of fluid as a function of the magnitude of transmitted torque but they also serve as a means for transmitting torque from the engine to the transmission. The pump must be designed to supply fluid at a very high pressure because the two discs and the rolling elements of the valve (which receives pressurized fluid from the pump) must transmit torque from the engine to the input member of the transmission. A considerable amount of pressurized fluid is permitted to escape from the valve so that losses due to leakage of pressurized fluid are quite high.

The same pump is used to adjust the ratio of the infinitely variable transmission. To this end, the power trains of Rattunde and Svab employ a regulating valve (e.g., a complex slide valve) which controls the pressure in the cylinder and piston units for the axially movable flanges of the sheaves. Thus, the regulating valve can raise the pressure in one of the units while reducing the pressure in the other unit to thus ensure a radial displacement of the torque transmitting element and hence a change of the transmission ratio.

A drawback of the just described conventional power trains is that the pump must deliver fluid at an elevated pressure several times the pressure which is required for changing the transmission ratio. This is due to the fact that the same pump also serves to raise the pressure of fluid in response to changes of transmitted torque. At the same time, the pump must convey the fluid at a high rate in order to ensure that the transmission ratio can be changed very rapidly in spite of the elevated pressure of conveyed fluid. Otherwise stated, losses of pressurized fluid are very high and continuous. Such losses are proportional to the rate of fluid flow at the aforediscussed elevated pressures. In addition, the conventional power trains employ a number of complex and expensive flow controlling and other regulating components which are prone to malfunction.

OBJECTS OF THE INVENTION

An object of the invention is to provide a novel and improved infinitely or continuously variable speed transmission with at least two adjustable sheaves which operates with less power loss than heretofore known transmissions.

Another object of the invention is to provide a transmission whose useful life is longer than that of conventional continuously variable speed transmissions.

A further object of the invention is to provide a transmission wherein the wear upon the sheaves and/or upon the means for transmitting torque between the sheaves is less pronounced than in presently used transmissions of such character.

An additional object of the invention is to provide a transmission wherein the useful life of sheaves and of the means for transmitting torque between the sheaves is prolonged by maintaining the extent of frictional engagement between the torque transmitting means and the sheaves to the absolutely necessary minimum.

Still another object of the invention is to provide a relatively simple and inexpensive continuously variable speed transmission which can be utilized with advantage in various types of conveyances as well as for many other purposes.

An additional object of the invention is to provide a transmission of the above outlined character which is more reliable and more versatile than conventional transmissions employing adjustable sheaves.

A further object of the invention is to provide a novel and improved adjustable variator for use in the above outlined transmission.

Another object of the invention is to provide simple and inexpensive controls and adjusting means for use in the above outlined continuously variable speed transmission.

An additional object of the invention is to provide novel and improved fluid flow and fluid pressure regulating means for use in the above outlined transmission.

A further object of the invention is to provide a novel and improved method of operating a continuously variable speed transmission.

Another object of the invention is to provide a power train which employs the above outlined transmission and to provide a conveyance (e.g., a motor vehicle) which embodies a power train employing the above outlined transmission.

SUMMARY OF THE INVENTION

The invention is embodied in an infinitely variable transmission which comprises a first rotary sheave serving to receive torque from a prime mover (e.g., an internal combustion engine) by way of a torque sensor, a second rotary sheave, and an endless flexible torque transmitting element which is trained over the sheaves. At least one of the sheaves comprises a first flange and a second flange which is movable toward and away from the first flange, and the transmission further comprises actuating means including a motor for moving the second flange relative to the first flange, means for selecting the ratio of the transmission, and means for operating the motor. The operating means includes the aforementioned torque sensor (which is connected with the prime mover) and means for controlling the motor as a function of selected transmission ratio and as a function of sensed torque. It is preferred to utilize a fluid operated motor and to select a controlling means which includes means for modifying the pressure of fluid in the motor as a function of the selected transmission ratio as well as a function of sensed torque.

The modifying means can include a pressure regulating valve which determines the fluid pressure in the motor, and means for adjusting the valve as a function of sensed torque and as a function of selected transmission ratio. The torque sensor can include means for pressurizing the fluid in dependency on the magnitude of sensed torque, and the adjusting means can include an actuator which is acted upon by pressurized fluid and controls the valve to determine the fluid pressure in the motor as a function of pressurization of fluid by the sensor. The valve and the actuator can constitute a module which can be installed in or removed from the transmission as a unit. The modifying means can further comprise a motion transmitting unit between the actuator and the valve. The valve can include a piston or another movable valving element, and the motion transmitting unit can include a lever which is pivotable as a function of the selected transmission ratio to thereby move the valving element. The motion transmitting unit can further comprise a fulcrum for the lever and means for coupling the fulcrum with the second flange.

Each of the sheaves can comprise a first flange and a second flange which is movable axially toward and away from the respective first flange. The actuating means of such transmission can include a fluid operated motor for each second flange and the operating means can include means for modifying the pressure of fluid in each of these motors as a function of selected transmission ratio and as a function of sensed torque.

The means for selecting the transmission ratio can comprise a package of dished springs and/or a fluid operated motor.

The transmission can further comprise at least one source of pressurized fluid and a circuit which connects the source with the transmission ratio selecting means. Such selecting means can include a motor in series with the motor of the actuating means. The at least one source of pressurized fluid can include a pump. The operating means can include an adjustable fluid pressure regulating valve in the circuit.

As mentioned above, the motor of the actuating means can constitute a fluid operated motor, and such motor is or can be connected in parallel with the motor of the ratio selecting means. This ensures that the axially movable flange is acted upon by the sum of forces supplied by the modifying means and by the ratio selecting means.

If the motor of the actuating means is a fluid operated motor, the operating means can comprise a fluid pressure regulating valve, a control unit having a signal emitting output, and means (e.g., one or more conductors and a solenoid) for transmitting signals from the output of the control unit to the valve.

The novel features which are considered as characteristic of the invention are set forth in particular in the appended claims. The improved transmission itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
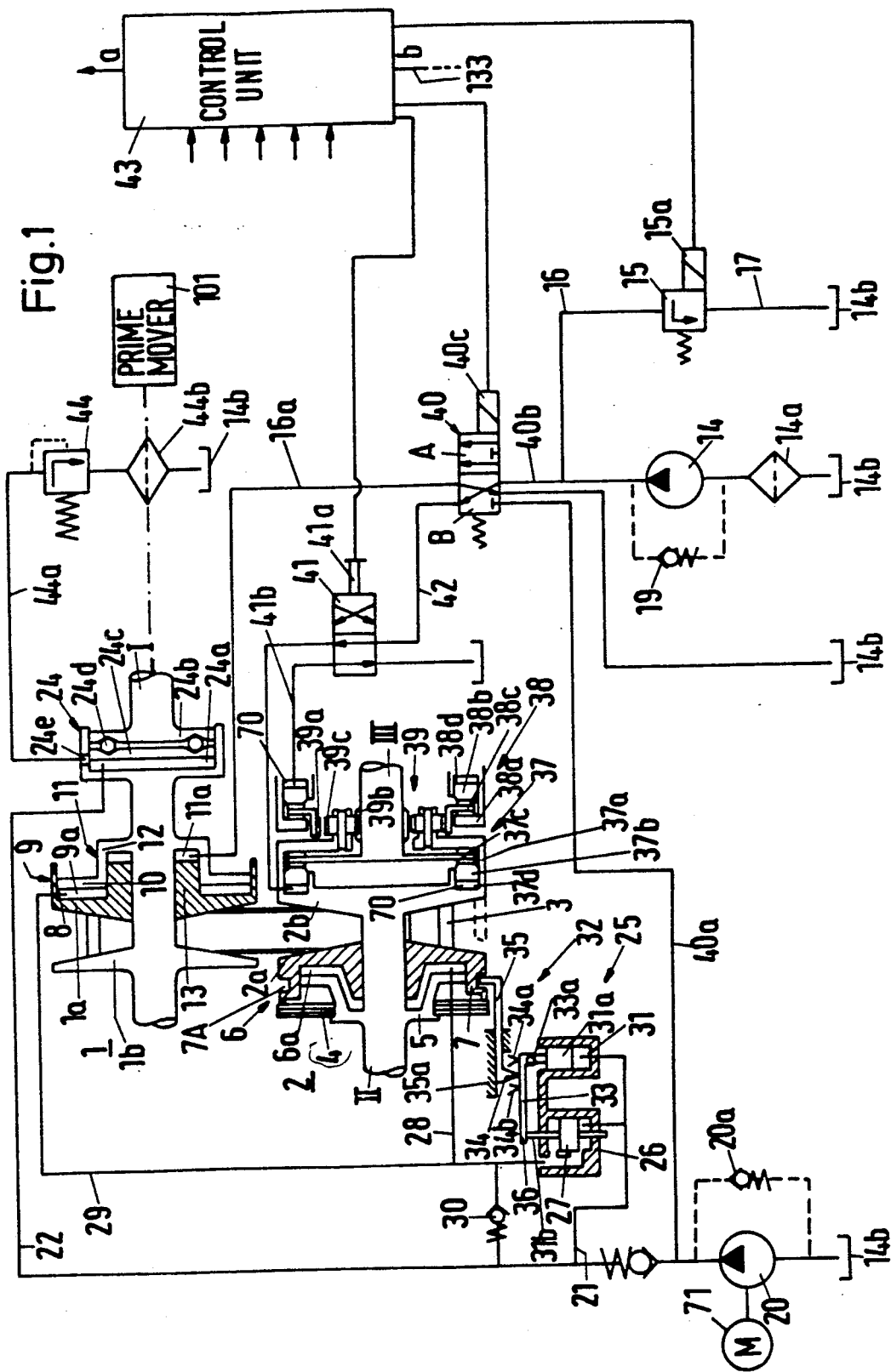
FIG. 1 is a diagrammatic partly elevational and partly sectional view of a transmission which can be utilized in the power train of a motor vehicle and employs two friction clutches and a first pressure modulating or correcting unit.

FIG. 1 shows a power train which can be utilized between the engine 101 and one or more pairs of wheels (not shown) in a motor vehicle. The power train includes an infinitely or continuously variable transmission which is in series with two friction clutches 37 and 38 serving to transmit torque to the wheels in a manner not forming part of the present invention.

The transmission comprises a rotary input member I which receives torque from the engine 101 and carries a first sheave 1, and a rotary output member II which can transmit torque to the engaged clutch 37 or 38 and carries a second sheave 2. The sheave 1 comprises two coaxial conical flanges 1a, 1b which share the rotary movements of the input member I, and the sheave 2 comprises two coaxial conical flanges 2a, 2b which share the rotary movements of the output member II. The flanges 1a, 2a are movable axially toward and away from the respective fixedly mounted flanges 1b and 2b. An endless flexible torque transmitting element 3 is trained over the sheaves 1, 2 in such a way that it includes a first looped portion between the confronting conical surfaces of the flanges 1a, 1b and a second looped portion between the confronting conical surfaces of the flanges 2a, 2b.

The axially movable flange 2a is permanently biased toward the flange 2b by a transmission ratio selecting resilient element here shown as a package of dished springs 4 having radially inner portions which react against an external shoulder of a piston 5 that is integral with the output member II. The radially outer portion of the package of dished springs 4 bears against the open end of a cylinder 7 which forms part of a fluid-operated motor 6. The latter further includes the piston 5 which cooperates with the cylinder 7 to define an annular cylinder chamber 6a surrounding a portion of the output member II. The characteristic of the package of springs 4 is such that the force which the springs exert upon the endless flexible element 3 (e.g., a belt or chain and hereinafter called chain) is greater when the first looped portion of the chain is nearer to the axis of the input member I. Such force is smaller when the first looped portion of the chain 3 is more distant from the axis of the input member I. The cylinder 7 can form an integral part of the axially movable flange 2a, i.e., the package of springs 4 can be said to bear against the flange 2a.

The axially movable flange 1a of the sheave 1 is integral with a cylinder 8 which forms part of a second fluid-operated motor 9, and this motor further includes a washer-like piston 10 which is integral with the input member I and extends into the cylinder 8 to define with the latter an annular cylinder chamber 9a. The motors 6, 9 together constitute an actuator of the continuously variable transmission.

A further fluid-operated motor 11 serves as another component of means for selecting or varying the ratio of the transmission including the input member I, the output member II, the sheaves 1, 2 and the chain 3. The motor 11 is confined within the cylinder 8 of the motor 9 and includes a cylinder 12 integral with the piston 10 and with the input member I, and a piston 13 which is integral with the axially movable flange 1a (and hence with the cylinder 8). The cylinder chamber of the motor 11 which forms part of the transmission ratio varying or selecting means is shown at 11a. It will be noted that the motors 9 and 11 are mechanically connected with each other and operate in parallel.

The input member I (which receives torque from the engine 101) further serves to drive a pump 14 which is installed in a hydraulic circuit including conduits 16, 16a, 17. The pump 14 draws a hydraulic fluid (e.g., oil and hereinafter called fluid) from a sump 14b, and the conduit 17 returns oil into the sump 14b at a rate which is determined by a pressure regulating device 15 here shown as a simple slide valve. This valve controls the motor 11, i.e., the ratio of the infinitely variable transmission, and is adjustable by an electronic control unit 43 through the medium of an adjusting means here shown as a solenoid 15a. Thus, the position of the valving element relative to the body of the valve 15 will be selected in dependency upon the desired or required ratio of the infinitely variable transmission. The conduit 16 of the hydraulic circuit including the conduits 16, 16a and 17 can admit pressurized fluid into the cylinder chamber 11a of the motor 11 by way of the conduit 16a in response to appropriate adjustment of a connecting means here shown as a distributing or regulating valve 40 which is installed between the conduits 16 and 16a.

The valving element of the valve 15 is movable between a first position in which the valve 15 permits pressurized fluid to flow from the pump 14 into the conduit 16a and thence into the cylinder chamber 11a (the fluid in the chamber 11a then causes the first looped portion of the chain 3 to move away from the axis of the input member I against the opposition of the package of dished springs 4) and a second position in which the conduit 17 returns fluid from the conduit 16 into the sump 14b. The valving element of the valve 15 can also assume any one of a plurality of intermediate positions.

A filter 14a is provided between the sump 14b and the intake of the pump 14. A preferably adjustable pressure relief valve or safety valve 19 is installed in the hydraulic circuit between the outlet of the pump 14 and the sump 14b to open when the fluid pressure in the conduit 16 reaches a preselected maximum permissible value.

The cylinder chamber 11a of the motor 11 is relatively small; therefore, the pump 14 is required to circulate a relatively small quantity of fluid, namely an amount which is approximately one-fourth of the amount required to fill the cylinder chamber 11a to capacity. This reduces the energy requirements and increases the efficiency of the pump 14 and of the transmission above that of a conventional transmission utilizing a pair of sheaves and an endless flexible torque transmitting element.

A pump 20 is provided to supply pressurized fluid from the sump 14b to a hydraulic circuit including conduits 21, 22, 28 and 29. The conduit 28 communicates with the cylinder chamber 6a of the motor 6, the conduit 29 communicates with the cylinder chamber 9a of the motor 9, and the conduit 22 communicates with the cylinder chamber 24a of a torque sensor 24 between the engine 101 and the input member I. The torque sensor 24 regulates the pressure in the cylinder chambers 6a and 9a as a function of the magnitude of selected or transmitted torque. The illustrated torque sensor 24 is a torque-regulated valve which is installed between the engine 101 and the input member I or between the input member I and the flanges 1a, 1b of the sheave 1 to transmit torque from the engine 101 to the sheave 1. A valve which can be used as a torque sensor and is similar to the torque sensor 24 is described and shown in the aforementioned German Pat. No. 28 28 347 to Rattunde and in the aforementioned commonly owned U.S. Pat. No. 5,046,991 to Friedmann. The valve 24 comprises a fixed disc 24b which can be an integral part of the input member I or of the output element of the engine 101, an axially movable disc 24c which is installed in the cylinder chamber 24c and acts not unlike a piston, and one or more spherical rolling elements or followers 24d which are installed between neighboring ramps or cams of the discs 24b and 24c. The cylinder of the valve forming part of or constituting the sensor 24 has at least one outlet in the form of a port 24e which can discharge pressurized fluid into the sump 14b at a rate dependent on the axial position of the disc 24c, namely on the magnitude of torque which is transmitted from the engine 101 to the sheave 1. When the magnitude of transmitted torque increases, the rolling elements 24d move the disc 24c axially and away from the disc 24b whereby the disc 24c reduces the effective area(s) of the outlet port(s) 24e and hence the rate of flow (leakage) of pressurized fluid from the conduit 22 of the second hydraulic circuit into the sump 14b. This raises the pressure in the cylinder chambers 6a and 9a accordingly, i.e., the pressure in these chambers is a function of the magnitude of torque which is being transmitted to the input member I and to the flanges 1a, 1b of the sheave 1. Since the motors 9 and 11 are connected in parallel, the force which is applied to the flange 1a of the sheave 1 by the pressurized fluid in the cylinder chamber 9a is added to the torque-dependent force which is applied to the piston 13 (i.e., to the flange 1a) by pressurized fluid in the cylinder chamber 11a.

The amount of fluid which is circulated by the pump 20 is relatively small, i.e., this pump must merely compensate for leakage of fluid from the motors 6, 9 and from the cylinder chamber 24a via outlet port(s) 24e, for eventual other leakage of oil (e.g., from the conduit 21, 22, 28 and/or 29) and for expansion of conduits and/or for expansion of other fluid-confining parts in response to a rise of fluid pressure therein. Save for compensation of losses due to leakage, it is not necessary to generate hydraulic energy in order to establish a fluid pressure which is proportional to transmitted torque because a compensation for changes of transmission ratio by the motor 11 merely involves a flow of fluid into the cylinder chamber 9a and simultaneous outflow of fluid from the cylinder chamber 11a or vice versa. The required output of the pump 20 is approximately one-sixth of the overall output of a corresponding pump in a heretofore known infinitely variable transmission with sheaves and an endless torque transmitting element. In addition, the sum of outputs of the composite fluid source including the pumps 14 and 20 is also a mere fraction of the required sum of outputs of corresponding pumps in heretofore known transmissions.

The clutch 37 or 38 is used to transmit torque from the output member II of the infinitely variable transmission to a further (second) output member III which serves to transmit torque to the axle or axles for one or more pairs of wheels or the like, not shown. Thus, the flow of power is from the engine 101, through the torque sensor 24, input member I, sheave 1, chain 3, sheave 2, output member II, clutch 37 or 38 and output member III. The arrangement is such that the clutch 37 serves to transmit torque from the output member II to the output member III in a first direction (e.g., in a forward direction) whereas the clutch 38 serves to transmit torque from the output member II to the output member III in a second direction (e.g., in reverse) counter to the first direction.

The clutch 37 which is shown in FIG. 1 comprises a first portion or part 37a which is secured to (e.g., integral with) the output member II and has a first friction surface, and a piston-like second portion or part 37b which is non-rotatably but axially movably secured to the first part 37a and has a second friction surface spaced apart from and confronting the friction surface of the part 37a. A clutch plate or clutch disc 37c is located between the parts 37a, 37b and is rigid (e.g., integral) with the output member III. The friction lining or linings of the clutch plate 37c are engaged by the friction surfaces of the parts 37a, 37b when the clutch 37 is engaged, namely when an annular plenum chamber 37d of the clutch 37 receives pressurized fluid from the pump 14 via conduit 16, distributing valve 40, a conduit 42, and an engaging means here shown as a second distributing or regulating valve 41.

The second clutch 38 comprises a counterpressure plate 38a which is rigid with a transmission case or housing and has a first friction surface, and a piston-like pressure plate 38b which is axially movable relative to the counterpressure plate 38a and has a second friction surface confronting the first friction surface. The pressure plate 38b cannot rotate relative to the counterpressure plate 38a and the clutch 38 further comprises a clutch plate or clutch disc 38c having friction linings which are engaged by the two friction surfaces when the pressure plate 38b is moved axially toward the counterpressure plate 38a in response to admission of pressurized fluid into a plenum chamber 38d of the clutch 38. The plenum chamber 38d can receive pressurized fluid in response to appropriate adjustment of the distributing values 40 and 41; at such time, pressurized fluid flows from the conduit 16 into the conduit 42 and thence into a conduit 41b. At the same time, the second distributing valve 41 seals the chamber 38d from the sump 14b.

The clutch plate 38c carries the ring gear 39a of a planetary 39 which further includes a sun gear 39b rigid with the second output member III. Planet pinions 39c mate with the ring gear 39a as well as with the sun gear 39b of the planetary 39. The planet pinions 39c are rotatably mounted on the part 37a of the first friction clutch 37.

The piston-like part 37b and the pressure plate 38b are biased by energy storing devices 70, e.g., diaphragm springs in a direction to disengage the respective friction clutches 37 and 38. Thus, when the pressure of fluid in the chambers 37d, 38d drops, the clutches 37 and 38 are completely or nearly completely disengaged to thus ensure that no torque (not even a drag torque) is being transmitted to the clutch plates 37c and 38c.

The distributing valve 40 is installed in each of the two hydraulic circuits which include the conduits 16, 16a, 17 and 21, 22, 28 and 29. Thus, the valve 40 can establish a path for the flow of pressurized fluid (via conduit 40a), and an outlet port of the valve 40 can admit pressurized fluid into the cylinder chamber 11a of the motor 11 or into the plenum chamber 38d of the second friction clutch 38 or (in response to resetting of the distributing valve 41) into the plenum chamber 37d of the first friction clutch 37 Thus, the distributing valve 40 can influence the ratio of the infinitely or continuously variable transmission or it can engage or permit disengagement of the friction clutch 37 or 38. The valve 40 which is shown in the drawing is a so-called 5/2-way distributing or regulating valve, and the distributing or regulating valve 41 is a so-called 4/2-way valve.

The valve 40 can be adjusted in dependency upon a plurality of different parameters in response to signals from the corresponding output of the electronic control unit 43. The solenoid of the valve 40 is shown at 40c. The clutch 37 or 38 can be engaged in response to appropriate changes of one or more parameters of the engine 101 which drives the input member I. The plenum chambers 37d, 38d of the clutches 37, 38 can receive pressurized fluid from the hydraulic circuit including the conduits 21, 22, 28, 29 (i.e., from the circuit which further includes the pump 20 and wherein the pressure of fluid is a function of transmitted torque) or from the hydraulic circuit including the conduits 16, 16a, 17 which further includes the pump 14 and wherein the pressure of fluid is a function of the adjustment of the pressure regulating valve 15.

The purpose of the second distributing valve 41 is to ensure that the clutch 37 is engaged (because its plenum chamber 37d is sealed from the sump 14b) when the clutch 38 is disengaged (because its plenum chamber 38d is connected with the sump 14b) and vice versa. Otherwise stated, signals from the control unit 43 to the solenoid 41a for the distributing valve 41 determine the direction of movement of the conveyance in which the power train including the transmission which is shown in the drawing is put to use. The distributing valve 41 can be adjusted by hand or by the solenoid 41a, i.e., in response to signals from the corresponding output of the control unit 43. The illustrated control unit 43 has inputs which can receive signals denoting the position of the throttle valve, the RPM of the engine 101, the output RPM, the position of a gear shift member (e.g., a lever) and the temperature of the engine 101.

The outlet of the pump 20 is connected with the sump 14b by way of a safety or relief valve 20a which opens when the pressure in the conduits 21 and 40a reaches a preselected value.

The pressure which is generated by the torque sensor 24 is not communicated directly to the fluid in the chambers 6a, 9a of the motors 6 and 9 because the improved transmission comprises a controlling device 25 which modifies the pressure in the chambers 6a, 9a as a function of fluid pressure established by the torque sensor 24 and as a function of fluid pressure which is indicative of the selected transmission ratio, i.e., of the pressure in the chamber 11a of the fluid operated motor 11 or of the condition of dished springs 4. The device 25 and the sensor 24 can be said to constitute a means for operating the motors 6, 9 (or at least one of these motors) so that the motor 9 and/or 6 is controlled in dependency on the aforementioned parameters, i.e., the selected transmission ratio and the magnitude of torque which is detected and transmitted by the sensor 24.

The controlling or modifying device 25 in the transmission of FIG. 1 comprises an adjustable pressure regulating valve 26 having a double-acting cylinder for a reciprocable piston 27. One cylinder chamber of the valve 26 is connected with the conduit 21 and the other of these chambers is connected with the conduits 28, 29, i.e., with the chambers 6a, 9a of the motors 6 and 9. The conduits 21, 22 connect the one chamber of the cylinder of the valve 26 with the chamber 24a of the torque sensor 24. The axial position of the piston 27 changes in response to pressure changes in the chamber 24a, i.e., in the conduits 21 and 22 and in the corresponding (one) chamber of the cylinder in the valve 26. This entails a change of fluid pressure in the conduits 28, 29 and in the chambers 6a, 9a of the respective motors 6, 9. A check valve 30 is provided to connect the conduit 29 with the conduit 22 (i.e., to establish a direct connection between the two cylinder chambers of the valve 26). The check valve 30 opens in response to a rise of fluid pressure in the conduits 28, 29 (i.e., in the chambers 6a and 9a) beyond a permissible maximum level.

The fluid pressure which is established by the sensor 24 and prevails in the one chamber of the valve 26 is modulated by an adjusting component 31 of the controlling device 25 in dependency on the selected ratio of the transmission, normally in dependency on the pressure in the chamber 11a and hence in dependency on the axial position of the axially movable flange 2a of the sheave 2. As a rule, the adjusting component 31 will lower the fluid pressure in the conduits 28, 29 and in the respective chambers 6a, 9a. The adjusting component 31 in the controlling device 125 of FIG. 1 is a fluid operated cylinder and piston assembly having a cylinder for a reciprocable piston 31a. The single chamber of the cylinder forming part of the assembly 31 is in direct communication with the conduit 21, i.e., the fluid pressure in this single chamber is the same as that in the chamber 24a of the torque sensor 24. The controlling device 25 further comprises a motion transmitting unit 32 which operates between the pistons 27, 31a and includes a lever 33, a fulcrum 34 for the lever 33 and a second lever 35 which serves as a means for coupling the fulcrum 34 to the axially movable flange 2a of the sheave 2. The fulcrum 34 is shiftable (by the lever 35 and flange 2a) between a first end position 34a and a second end position 34b. One arm of the lever 33 is articulately connected to the piston 31a by a pivot member 33a and the other arm 36 of the lever 33 bears upon the piston rod 31b which is coaxial with and rigidly connected to the piston 27. The arrangement is such that the motion transmitting unit 32 including the lever 33 can adjust the axial position of the piston 27 (and hence the fluid pressure in the chambers 6a, 9a) as a function of the selected transmission ratio, namely in dependency on the axial positions of the movable sheaves 1a and 2a (i.e., on the fluid pressure in the chamber 11a of the motor 11).

The valve 26 and the assembly 31 are preferably confined in a common housing to constitute a readily manipulatable module.

The illustrated lever 35 is reciprocable in a guide 35a and is form-lockingly connected to the flange 2a in that it comprises a bent end portion which is received in an external groove 7A of the cylinder 7 (the latter is integral with the flange 2a).

The factor by which the motion transmitting unit 32 of the controlling device 25 reduces the pressure in the conduits 28, 29 and in the respective chambers 6a, 9a below the fluid pressure in the chamber 24a of the torque sensor 24 depends upon the ratio of the linkage including the levers 33 and 35. When the fulcrum is moved to the end position 34a, that portion of the chain 3 which is trained over the sheave 1 is disposed at a minimum distance from the axis of the input member I, i.e., the other loop of the chain 3 is located at a maximum distance from the axis of the output members II and III. The transmission then acts as a step-down transmission because the transmission ratio assumes a maximum value so that rotation of the input member I by the engine 101 (via torque sensor 24) at a first speed entails a rotary movement of the output member II at a lowest second speed. At such time, the flanges of the sheaves 1 and 2 must bear against the adjacent portions of the chain 3 with a maximum force in order to ensure that the chain 3 can transmit torque from the input member I to the output member II without any slippage or with a minimum of slippage. As can be seen in FIG. 1, the fulcrum 34 is located on, or at least close to, the axis of the piston 31a when this fulcrum assumes the end position 34a. Thus, the force which is applied by the piston 31a has little or no influence upon the pressure regulating valve 26 because the transmission ratio of the unit 32 including the levers 33, 35 is zero or at least close to zero. Consequently, the pressure of fluid which is confined in the chambers 6a, 9a can match the pressure of fluid in the chamber 24a of the torque sensor 24.

When the fulcrum 34 is moved to the other end position 34b, the chain 3 is located at a maximum radial distance from the axis of the input member I and the axis of the output member II is located at a minimal radial distance from the corresponding looped portion of the chain 3. At such time, the transmission acts as a step-up transmission in that the RPM of the output member II exceeds the RPM of the input member I. The lever 33 then acts as a genuine two-armed lever because the fulcrum 34 is remote from the axis of the piston 31a. Thus, the piston 31a can influence the axial position of the piston 27 in the cylinder of the valve 26, namely in a sense to reduce the pressure of fluid in the conduits 28, 29 and in the corresponding chambers 6a, 9a as a function of the prevailing ratio of the transmission, i,e., as a function of the axial position of the flange 2a relative to the associated fixedly mounted flange 2b on the output member II. At the same time, the fluid pressure in the chambers 6a, 9a is still a function of the fluid pressure in the chamber 24a of the torque sensor 24 because the single cylinder chamber of the assembly 31 continues to communicate with the chamber 24a via conduits 22 and 21. It can be said that the pressure in the chambers 6a, 9a is dependent upon the pressure of fluid in the chamber 24a (i.e., in the single cylinder chamber of the assembly 31) but that the influence of pressure of fluid in the chamber 24a upon the pressure of fluid in the chambers 6a, 9a is also affected by fluid pressure in the motor 11, namely by the axial position of the flange 2a relative to the flange 2b and hence by selected ratio of the transmission including the sheaves 1 and 2. The rate at which the influence of selected transmission ratio upon the fluid pressure in the chambers 6a, 9a varies in response to a change in the selected transmission ratio can be determined in advance by appropriate design of the assembly 31 and unit 32 including the levers 33, 35.

As shown, the motor 11 is connected in parallel with the motor 9; therefore, the force acting upon the flange 1a of the sheave 1 is a sum of forces including that generated by fluid in the chamber 11a and acting upon the piston 13 and that generated by fluid pressure in the chamber 9a under the influence of the controlling device 25.

The pump 20 pressurizes the fluid which is supplied to the chamber 24a via conduit pressure is modified by the controlling device 25. As mentioned above, this pump must compensate for leakage of fluid in various conduits and for leakage from the chambers 6a, 9a as well as for the leakage of fluid from the chamber 24a via outlet 24e and for additional fluid requirements as a result of expansion of conduits and/or of other fluid confining parts. However, it is not necessary to generate any hydraulic energy for pressure which is varied proportionally with variations of sensed torque and/or proportionally with changes in the selected transmission ratio. The reason is that changes of transmission ratio are compensated for by simple flow of fluid from one chamber into another chamber.

FIG. 1 shows the valving elements of the valves 40 and 41 in positions they assume when the conveyance which is to be driven by the power train including the illustrated transmission is to be set in motion, i.e., preparatory to start of torque transmission from the input member I to the output member II. If the conveyance is to be driven in the forward direction, the valves 40, 41 connect the plenum chamber 37d of the friction clutch 37 with the pump 14 which causes the fluid pressure in the chamber 37d to assume a value determined by the setting of the slide valve 15. The valve 15 is controlled by the electronic control unit 43, for example, in dependency on the position of the gas pedal or another fuel flow regulating part, in dependency on the slippage of friction clutch 37 and, if desired or necessary, in dependency on one or more additional parameters such as the temperature of the engine 101, the position of the gear shift lever (i.e., whether the lever is in a position for direct drive, sporty drive, drive in reverse, in a neutral position or in a position for parking). The control unit 43 can comprise a processor with a memory which is addressed to furnish signals which are processed and transmitted to the solenoid 15a to initiate the transmission of torque from the input member I to the output member II. The signals are or can be updated while the conveyance is in motion. For example, the signals can correspond to various predetermined positions or modes of operation of a member, such as a gas pedal, which controls the admission of fuel to the engine 101, e.g., a standard internal combustion engine.

The valve 15 can constitute or include a proportional valve which receives from the control unit 43 electric signals having an intensity or another characteristic denoting one or more parameters which are to influence the pressure of fluid in the conduit 16. The signals are indicative of parameters represented by information which is stored in the memory of the control unit 43 and/or of parameters which are monitored during various stages of operation including starting of the conveyance. For example, the position of the gas pedal can correspond to a particular RP1 of the engine 101, namely an RPM which is particularly suitable for setting the conveyance in motion. If the actual RPM of the engine 101 (i.e., of the input member I) is less than the desired or optimal RPM, the proportional valve 15 raises the pressure of fluid in the conduits 16 and 42. This is achieved by appropriate changes in intensity of the signal which is transmitted from the control unit 43 to the solenoid 15a and entails a more pronounced engagement (lesser slippage) of the friction clutch 37 between the output members II and III.

The torque sensor 24 performs the additional function of ensuring that, during the starting and torque increasing stages, abrupt changes of torque or any changes of transmitted torque cause the flanges 1a, 1b and 2a, 2b of the sheaves 1 and 2 to bear against the adjacent portions of the chain 3 with a correspondingly increased or reduced force. This ensures that the flanges of the sheaves 1, 2 cannot slip relative to the chain 3 and/or vice versa. Thus, the circulation of pressurized fluid is subject to automatic mechanical regulation, i.e., without relying on electronic parts and without any interference from the outside, while the power train is in the process of starting the transmission of torque from the engine 101 to the second output member III. Such automatic regulation of pressure in the hydraulic circuit 21, 22, 28, 29 takes place in response to signals from the torque sensor 24 (i.e., in response to changes of axial position of the disc 24c) and renders it possible to considerably reduce the cost of the power train because only the valve 15 constitutes or can constitute a relatively complex and expensive proportional valve whereas the distributing valves 40, 41 are simple commercially available 5/2-way and 4/2-way valves. This is due to the fact that the valve 15 can be put to use during starting of the motor vehicle in forward or in reverse.

The invention is based on the recognition that starting of the infinitely or continuously variable transmission including the sheaves 1, 2 and the chain 3 does not necessitate an advance selection of the ratio of the transmission. The reason is that the package of dished springs 4 which act upon the axially movable flange 2a of the secondary sheave 2 invariably biases the flange 2a toward the flange 2b so that the conical surfaces of the flanges 2a, 2b engage the adjacent looped portion of the chain 3 with a requisite force and maintain the other looped portion of the chain 3 at an optimal distance from the axis of the input member I, i.e., the springs 4 select the optimum transmission ratio for the starting operation. At such time, the springs 4 ensure that the upper looped portion of the chain 3 is located at a minimal distance from the axis of the input member I and the lower looped portion of the chain 3 is located at a maximum distance from the axis of the output member II. Thus, the ratio of the infinitely variable transmission is the maximum step-down transmission ratio.

When the initial stage of the starting operation is completed, i.e., when the clutch 37 is engaged and operates without any slip or with a desirable optimum slip (such as is desirable or advantageous to compensate for eventual vibrations or for fluctuations of RPM of the output member II), the plenum chamber 37d of the friction clutch 37 is connected with the hydraulic circuit including the conduits 21, 22, 28, 29 wherein the pressure of fluid is a function of the momentarily transmitted torque. This is achieved by adjusting the distributing valve 40 through the medium of the solenoid 40c. The other hydraulic circuit including the conduits 16, 16a, 17 is simultaneously connected with the cylinder chamber 11a of the motor 11, i.e., of that component which determines the ratio of the transmission. At such time, the portion A of the valving element of the distributing valve 40 is effective to control the flow of fluid in the conduits 16, 40, 16a and 42.

The mode of operation during starting is analogous if the distributing valve 41 is adjusted so that the conduit 42 can deliver fluid into the plenum chamber 38d of the valve 38 and the chamber 37d of the valve 37 is free to discharge fluid into the sump 14b.

One of the friction clutches 37, 38 is optional; thus, the power train can operate with a single clutch if the other clutch is replaced with other suitable means for changing the direction of rotation of the output member III. If the clutch 37 or 38 is omitted, the distributing valve 41 is also omitted.

The shifting of valving element of the distributing valve 40 from the one to the other end position (from A to B) should take place not later than when the ratio of the transmission is to be stepped up, i.e., in a sense to increase the RPM of the output member II and the speed of the conveyance.

When the conveyance is in motion, the valve 15 is adjusted to select in the conduits 16, 16a that pressure which is necessary for a selected transmission ratio. Such adjustment of the valve 15 takes place in dependency upon one or more parameters of the conveyance, particularly one or more parameters of the engine 101 and the parameter or parameters of the means (such as the gas pedal) for selecting the rate of admission of fuel to the engine 101.

The transmission which is shown in FIG. 1 further comprises a pressure regulating or pressure relief valve 44 which is installed in a conduit 44a connecting the outlet port or ports 24e of the torque sensor 24 with the sump 14b. The purpose of the pressure regulating valve 44 is to ensure that the pressure in the chamber 24a of the torque sensor 24 cannot drop below a preselected threshold value, namely that the pressure of fluid in the circuit including the conduits 21, 22, 28 and 29 cannot drop below a certain value even if the magnitude of transmitted torque is zero. For example, such minimum fluid pressure in the conduits 21, 22, 28 and 29 can be in the range of 2 bar. The exact magnitude of minimal fluid pressure in the conduits 21, 22, 28, 29 will depend on the restoring force of the energy storing means 70 (e.g., dished springs) which act upon the axially movable piston-like part 37b of the clutch 37 and/or upon the axially movable pressure plate 38b of the clutch 38 in a direction to disengage the respective clutches. As a rule, the minimum pressure which is maintained by the valve 44 in the circuit including the conduits 21, 22, 28, 29 should be sufficient to ensure that, when the torque equals zero, the clutch 37 and/or 38 is maintained in a state of slip which ensures that the magnitude of torque capable of being transmitted from the output member II to the output member III in either direction is zero or does not exceed a predetermined minimal value. Otherwise stated, the purpose of the valve 44 in the conduit 44a is to ensure that, when the torque between the engine 101 and the input member I equals or closely approximates zero, the friction surfaces of the parts 37a, 37b are in contact with the friction linings of the clutch plate 37a in the clutch 37 and/or that the friction surfaces of the pressure plates 38a, 38b are in contact with the friction linings of the clutch plate 38c in the friction clutch 38. An advantage of such design and/or adjustment of the valve 44 is that the clutch 37 or 38 is not disengaged in response to a change of load, i.e., as a result of transition from positive to negative torque. This is due to the fact that, in urging the fluid to flow from the conduits 21, 22 into the conduit 44a and thence into the sump 14b, the pump 20 must overcome the resistance which is offered by the valve 44; this ensures that the pressure in the conduits 21, 22 is sufficiently high to maintain the clutch 37 or 38 in partly engaged condition. The closing or engaging force acting upon the clutch 37 or 38, when the transmitted torque equals or approximates zero, can be selected in such a way that the partially engaged clutch is incapable of transmitting any torque or can transmit a relatively small or medium torque which is sufficiently small to ensure reliable filtration or elimination of peaks of torque and/or of peaks of vibratory movements by permitting the output member II to slip relative to the output member III.

The pressure regulating valve 44 can constitute a non-adjustable valve or an adjustable valve. If the valve 44 is adjustable, it is connected to the output a of the control unit 43 or is connected to another control unit. This renders it possible to adjust the valve 44 in dependency on one or more operational parameters, especially engine parameters such as the rate of fuel delivery to the engine 101 and/or the temperature of fluid and/or others. This, in turn, renders it possible to select the minimum resistance of the adjustable valve 44 to the flow of fluid through the conduit 44a and into the sump 14b in dependency upon one or more factors, such as the aforementioned parameters. Thus, it is possible to select the pressure of fluid in the conduits 21, 22 and 44a in such a way that, when the magnitude of transmitted torque equals or approximates zero, the clutch 37 or 38 can transmit a selected torque, e.g., in dependency on the temperature of fluid and/or in dependency on the rate of admission of fuel into the engine 101.

The conduit 44a preferably contains a filter 44b, such as an oil filter, which is installed between the valve 44 and the sump 14b. The latter is shown at several different locations for the convenience of illustration. As a rule, the transmission will comprise a single fluid collecting vessel (such as an oil tank).

At least one of the friction clutches 37, 38 can be regulated in dependency on one or more parameters in a manner as disclosed, for example, in commonly owned German patent application No. P 40 11 850.9 and/or in dependency on certain other parameters. The difference is that, in the structure which is disclosed in the German patent application No. P 40 11 850.0, the clutches are disengaged as a result of generation of hydraulic pressure; on the other hand, the transmission of the present invention employs one or more friction clutches which are engaged in response to a rise of fluid pressure (in the respective plenum chambers 37d, 38d).

Figure 2:
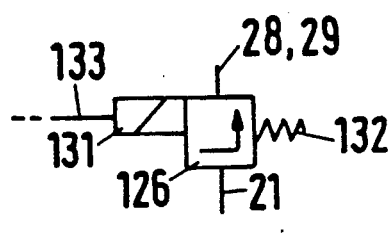
FIG. 2 is a diagrammatic view of a modified pressure modulating or correcting unit.

The package of dished springs 4 serves to store energy in order to apply a force which is dependent upon the transmission ratio. If desired, the package 4 can be replaced with another suitable energy storing device such as a cylinder-piston assembly which is incorporated into or is associated with the sheave 2 substantially in the same way as described in connection with the sheave 1 and the cylinder-piston assembly 11. Reference may be had to FIG. 2 of the copending German patent application No. P 40 36 683.9. This German patent application describes and shows a valve 36 which, if incorporated into the transmission of FIG. 1 in the present case, would be installed downstream of the valve 40, namely in the conduit 16a. The incorporation of such valve into the conduit 16a would further necessitate the provision of a conduit between the valve in the conduit 16a and the cylinder-piston assembly serving to select the transmission ratio and replacing the package of dished springs 4.

It will be seen that, in the transmission of FIG. 1, the friction clutches 37, 38 are acted upon substantially directly by that fluid pressure which is determined by the torque sensor 24. However, it is equally possible to connect the conduit 40a (leading from the outlet of the pump 20 to the corresponding port of the valve 40) with the conduit 28 or 29 in lieu of with the conduit 21 or 22. This would ensure that the hydraulic pressure which is applied to the friction clutches 37, 38 would match the pressure which is applied to the motors 6 and 9.

The engine 101 can drive the pump 14 as well as the pump 20. Such engine can constitute an internal combustion engine. However, it is equally within the purview of the invention to provide a discrete prime mover (e.g., an electric motor) for at least one of the pumps 14 and 20 (see the motor 71). The discrete prime mover 71 can be operated in dependency upon one or more predetermined operational parameters, such as one or more parameters of a motor vehicle or of an engine in a motor vehicle. This renders it possible to change the operating point of the respective pump, i.e., one can change the rate of delivery of pressurized fluid and/or the pressure of fluid at the output of the pump (20) which is driven by a discrete prime mover (71).

FIG. 2 shows a modified pressure controlling device which includes a pressure regulating valve 126 and a solenoid 131 replacing the adjusting component 31 of the controlling device 25. The solenoid 131 serves to adjust or regulate as well as to actuate the valve 126. Thus, the solenoid 131 ensures that the pressure which prevails in the conduit 21 (i.e., which is determined by the torque sensor 24) is properly modulated prior to being applied to the fluid in the conduits 28, 29 (i.e., in the motors 6 and 9). The inlet port of the valve 126 is connected with the conduit 21, and the outlet port of this valve is connected with the conduit 28 (and hence also with the conduit 29). A restoring spring 132 is provided to bias the valving element of the valve 126 to a predetermined starting position. It is clear that the spring 132 can be utilized in conjunction with, or that this spring can be replaced by, other suitable restoring means, such as a hydraulic cylinder-piston assembly (not shown). The valve 126 preferably constitutes a piston type valve or a slide valve.

The valve 126 can be designed to constitute a proportional valve which receives signals from an electronic control unit (such as the control unit 43 of FIG. 1) which transmits signals (e.g., voltage signals) to the solenoid 131 from the outlet b via conductor 133). Such signals can be indicative of various parameters, regulating variables and/or disturbances which are memorized in or ascertained and evaluated or processed by the control unit 43 or by another suitable control unit. The parameter or parameters which are represented by signals from the output b of the control unit 43 to the solenoid 131 for the valve 126 of FIG. 2 preferably include the selected ratio for the transmission. Additional parameters can include the oil temperature in the engine 101 and/or the oil temperature in the transmission or its sump 14b and/or the temperature of fluid (normally oil) in the circuit 21, 22, 28, 29 and/or the temperature of fluid (normally oil) in the circuit 16, 16a, 17. Still further, signals which are transmitted to the solenoid 131 can be indicative of the quantity of fuel which is being supplied to the engine 101 (e.g., the position of a gas pedal or another fuel flow controlling member), the RPM of the engine 101, the RPM of the output member II or III of the transmission, the position of the aforediscussed gear shift lever and/or one or more additional parameters which influence the torque of the output element of the engine 101 and/or the torque which is being applied to the input member I of the transmission.

The design of the valve 126 is preferably such that, when the solenoid 131 is not energized, the valve 126 does not interfere with the flow of fluid from the conduit 21 to the conduits 28, 29. This ensures that the pressure in the chambers of the motors 6, 9 matches or approximates the pressure in the chamber 24a of the sensor 24 when the solenoid 131 and/or the control unit 43 and/or the connection b, 133 between the control unit 43 and the solenoid 131 is out of commission. This results in a reduction of effectiveness of the transmission but the latter is still capable of transmitting torque from the engine 101 to the part or parts which are driven by the output member III.

It is further possible to employ a device (not shown) which monitors the selected ratio of the transmission by cooperating with the flange 1a and/or 2a of the sheave 1 and/or 2. A suitable monitoring device can include an inductive displacement transducer, e.g., a linear potentiometer which is connected with an input of the control unit 43 by suitable conductor means. This enables the control unit 43 to receive and evaluate signals which denote the axial position of the movable flange relative to the other flange of the sheave 1 and/or 2.

An important advantage of the feature that the pressure of fluid in the motor 9 and/or 6 is influenced by the selected transmission ratio (such ratio is selected by the dished springs 4 and/or by the motor 11) as well as by the magnitude of transmitted torque (as determined by the sensor 24) is that the frictional engagement between the chain 3 and the flanges 1a, 1b and 2a, 2b of the sheaves 1, 2 can be reduced to a minimum, especially in the partial load range. This is desirable and advantageous because one ensures that losses due to clamping of the chain 3 between the flanges of the sheaves 1 and 2 are relatively small or negligible. Otherwise stated, the improved transmission is designed in such a way that the engagement between the chain 3 on the one hand and the flanges of the sheaves 1, 2 on the other hand is just sufficient to permit the transmission of torque from the input member I to the output member II but such engagement need not be more pronounced. The design of the pressure controlling or modifying device 25 or 126, 131 can be such that this device modifies the pressure which is determined by the torque sensor 24 by a given factor in dependency on the pressure in the chamber 24a and also in dependency on the selected transmission ratio. The aforementioned factor can be such that the controlling device multiplies the pressure which is determined by the sensor 24. Since the factor is dependent upon the selected transmission ratio, it varies as a function of variations of transmission ratio. The controlling unit corrects or modifies the pressure which is determined by the torque sensor 24 by a certain percentage or factor so that the motor 9 for the axially movable flange 1a and/or the motor 6 for the axially movable flange 2a is acted upon by a fluid whose pressure is a function of the pressure determined by the sensor 24 and a function of the pressure determined by the selected transmission ratio.

For example, when the chain 3 is permitted to move close to the axis of the input member I so that the transmission acts as a step-down transmission, the pressure which is determined by the sensor 24 cannot or need not be altered, i.e., the pressure of fluid in the conduits 28, 29 is the same as the pressure in the chamber 24a because the aforementioned factor the influence of the selected transmission ratio equals one. If the chain 3 is caused to move at a maximum distance from the axis of the input member I (i.e., if the transmission acts as a step-up transmission), the pressure in the motor 9 and/or 6 is less than the pressure in the chamber 24a because the aforementioned factor does not equal one. If such factor is 0.5, the pressure in the conduits 28, 29 and chambers of the cylinders 6, 9 is reduced by 50 percent, i.e., the pressure in the chambers of the motor 6, 9 can be arrived at by multiplying the pressure in the chamber 24a by the factor 0.5. Thus, the valve 26 or 126 can be said to constitute a pressure reducing valve which reduces the pressure of fluid (as determined by the sensor 24) by a factor which is influenced by the selected ratio of the transmission. With renewed reference to FIG. 1, this will be readily appreciated by bearing in mind that the lower chamber of the housing of the valve 26 contains fluid whose pressure matches that in the chamber 24a but the pressure of fluid in the upper chamber of such valve housing is less than, or at most matches, the pressure of fluid in the lower chamber because the pressure in the upper chamber can be reduced due to the establishment of an operative connection between the transmission ratio selecting means 4, 11 and the piston 27 of the valve 26. The position of the piston 27 can also be influenced by the motor 11, i.e., by the axial position of the flange 1a which is indicative of the selected transmission ratio.

The utilization of a valve 26 or 126 which constitutes a piston valve or a slide valve has been found to be particularly advantageous because this contributes to simplicity and lower cost of the means for regulating the pressure of fluid in the motor 6 and/or 9. As shown in FIG. 1, the (piston) valve 26 is constructed and installed in such a way that its piston 27 is acted upon directly by fluid (in conduit 21) whose pressure is determined by the torque sensor 24, and that this piston is also acted upon by the unit 32 whose condition is indicative of the selected transmission ratio. The valve 26 exhibits the advantage that the developing static forces (i.e., forces acting upon the piston 27 due to the pressure differential between the conduits 21, 22 and 28, 29) can be readily balanced so that, once such forces are balanced, there develop only hydrodynamic forces. This renders it possible to move the piston 27 to an axial position which is accurately indicative of the optimal fluid pressure in the motor 9 and/or 6, i.e., of the force with which the flanges of the sheaves 1, 2 engage the chain 3.

The lever 35 of the motion transmitting unit 32 which is shown in FIG. 1 need not pivot at all, i.e., it can simply slide in the guide 35a in dependency on axial displacements of the flange 2a relative to the flange 2b. In fact, the illustrated form-locking connection between the lever or slide 35 and the flange 2a can be replaced by any other suitable connection which enables the flange 2a to rotate about the axis of the output member II while simultaneously shifting the fulcrum 34 between the end positions 34a, 34b in response to axial displacement toward or away from the flange 2b.

As mentioned above, the valve 26 or 126 can influence the pressure in the chamber of the cylinder 9 and/or 6, always as a function of the fluid pressure which is determined by the torque sensor 24 and as a function of the selected transmission ratio.

As a rule, proper modification of fluid pressure prevailing in the conduits 21, 22 prior to application to the fluid in the conduits 28, 29 will involve a certain leakage of fluid downstream of the valve 26 or 126. The extent of such leakage can be determined by a suitable valve (not specifically shown) or the motor 6 and/or 9 can be designed to permit certain leakage of fluid. It has been found that a leakage of approximately 200 ccm per minute per sheave is quite acceptable and satisfactory.

The utilization of fluid-operated transmission ratio selecting means is particularly desirable and advantageous when the improved transmission is installed in a conveyance, e.g., in a motor vehicle. This involves the provision of at least one source of fluid (such as the pump 14 and/or 20). Moreover, at least one of the axially movable flanges 1a, 2a is acted upon by a motor (such as the motor 9). The motor 9 cooperates with the motor 11, e.g., in a manner as disclosed in full detail in the aforementioned commonly owned copending German patent application No. P 40 36 683.9. The force which is applied by the motor 9 is dependent at least upon the fluid pressure which is determined by the sensor 24, and the force which is furnished by the motor 11 is dependent at least upon the selected transmission ratio. The valve 26 or 126 is in circuit at least with the motor 9, i.e., with the motor wherein the fluid pressure is determined by the sensor 24.

As mentioned above, the transmission can be provided with a further motor which is analogous to the motor 11 but cooperates with the motor 6 to determine the force with which the axially movable flange 2a of the sheave 2 is urged against the adjacent portion of the chain 3. The pressure in the further motor is influenced by the selected transmission ratio, and the pressure in the motor 6 is influenced at least by the fluid pressure in the chamber 24 of the sensor 24.

The pump 14 or 20 can supply pressurized fluid for the circuit 16, 16a, 17 as well as for the circuit 21, 22, 28, 29. The circuit 16, 16a, 17 serves for selection of the transmission ratio, and the circuit 21, 22, 28, 29 serves to ensure that the fluid pressure in the chambers of the motors 6, 9 is a function of fluid pressure as determined by the sensor 24 as well as a function of the selected transmission ratio. All that is necessary is to provide the pump 14 or 20 with two outlets, one for the delivery of fluid to the conduit 21 and the other for the delivery of fluid to the conduit 40b. The utilization of two discrete pumps is preferred at this time because the pump 20 can be designed to supply only that quantity of fluid which is necessary to compensate for leakage. However, such pump (20) need not furnish hydraulic energy for the torque-determined fluid pressure. The other pump (14) is merely required to supply fluid which is needed for selection of the transmission ratio; the fluid which flows to and from the chambers of the motors 6, 9 in response to a change of selected transmission ratio merely flows back and forth between various chambers but need not be continuously replaced.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims

We claim:

1. A continuously variable speed transmission comprising a first rotary sheave arranged to receive torque from a prime mover; a second rotary sheave arranged to transmit torque to an output member; an endless flexible torque transmitting element trained over said sheaves, each of said sheaves comprising a first flange and a second flange movable toward and away from the respective first flange; actuating means including a fluid operated motor for moving at least one of said second flanges relative to the respective first flange; means for selecting the ratio of the transmission; and means for operating said motor including a torque sensor interposed between the prime mover and the output member, and means for controlling said motor as a function of selected transmission ratio and as a function of sensed torque including means for modifying the pressure of fluid in said motor as a function of selected transmission ratio and as a function of sensed torque.

2. The transmission of claim 1, wherein said modifying means includes a pressure regulating valve which determines the fluid pressure in said motor and means for adjusting said valve as a function of sensed torque and as a function of selected transmission ratio.

3. The transmission of claim 2, wherein said sensor includes means for pressurizing the fluid in dependency on the magnitude of sensed torque, said adjusting means including an assembly which is acted upon by pressurized fluid and controls said valve to determine the fluid pressure in said motor as a function of pressurization of fluid by said sensor.

4. The transmission of claim 3, wherein said valve and said assembly together constitute a module.

5. The transmission of claim 3, wherein said modifying means further comprises a motion transmitting unit between said assembly and said valve.

6. The transmission of claim 5, wherein said valve comprises a movable valving element and said unit includes a lever which is pivotable as a function of the selected transmission ratio to thereby move said valving element.

7. The transmission of claim 6, wherein said unit further comprises a fulcrum for said lever and means for coupling said fulcrum with said at least one second flange.

8. The transmission of claim 1, wherein said actuating means includes a fluid operated motor for each of said second flanges and said operating means includes means for modifying the pressure of fluid in each of said motors as a function of selected transmission ratio and as a function of sensed torque.

9. The transmission of claim 1, wherein said selecting means includes a fluid operated motor.

10. The transmission of claim 1, further comprising at least one source of pressurized fluid, a first circuit connecting said at least one source with said motor, and a second circuit connecting said source with said selecting means, said selecting means including a motor acting upon said at least one second flange jointly with the motor of said actuating means.

11. The transmission of claim 10, wherein said at least one source includes a pump.

12. The transmission of claim 10, wherein said operating means comprises an adjustable fluid pressure regulating valve in said first circuit.

13. The transmission of claim 1, wherein said selecting means comprises a second fluid-operated motor in parallel with the motor of said actuating means and said motors acting upon said at least one second flange.

14. The transmission of claim 1, wherein said operating means comprises a fluid pressure regulating valve, a control unit having a signal emitting output and means for transmitting signals from said output to said valve.

15. The transmission of claim 14, wherein said signal transmitting means comprises a solenoid.

* * * * *